United States Patent [19]

Takimoto et al.

[11] 4,386,376
[45] May 31, 1983

[54] VIDEO CAMERA

[75] Inventors: Hiroyuki Takimoto, Yokohama; Tatsuzo Ushiro, Tokyo, both of Japan

[73] Assignee: Canon Kabushiki Kaisha, Tokyo, Japan

[21] Appl. No.: 221,785

[22] Filed: Dec. 31, 1980

[30] Foreign Application Priority Data

Jan. 15, 1980 [JP] Japan .............................. 55-2862[U]

[51] Int. Cl.³ ........................ H04N 5/78; G11B 31/00
[52] U.S. Cl. ............................ 358/335; 360/33.1
[58] Field of Search ............... 358/50, 209, 217, 127, 358/335, 310, 311; 360/33, 35, 79, 14, 55, 14.1, 14.2, 14.3, 33.1; 307/296; 328/270

[56] References Cited

U.S. PATENT DOCUMENTS

| 3,931,636 | 1/1976 | Schneider | 358/50 X |
| 3,956,669 | 5/1976 | Del Ciello | 328/270 X |
| 3,974,522 | 10/1976 | Fukatsu et al. | 360/14 |
| 4,057,830 | 11/1977 | Adcock | 358/127 |
| 4,163,263 | 7/1979 | Rotter | 360/14 |

OTHER PUBLICATIONS

Imai et al., "Micropower Consumption Handy LSI TV Color Camera for ENG System", NEC Res. & Dev., No. 45, Apr. 1977, pp. 72-82.

Primary Examiner—James W. Moffitt
Assistant Examiner—Donald McElheny, Jr.
Attorney, Agent, or Firm—Fitzpatrick, Cella, Harper & Scinto

[57] ABSTRACT

A video camera disclosed herein is used with video recorders, said camera being provided with first and second trigger switches which are manually operated in succession, said camera further including an image pickup tube having a heater circuit therefor which is energized when the camera is operatively connected with a video recorder or when a power switch in the video recorder is turned on in the connection of said video recorder with said camera or when a recording switch is further turned on after said power switch has been turned on, said camera further including other circuits which are energized by turning on said first trigger switch, said camera being adapted to generate a recording start signal for the video recorder when said second trigger switch is turned on.

11 Claims, 3 Drawing Figures

VIDEO CAMERA

BACKGROUND OF THE INVENTION

1. Field of the Invention

This invention relates to a video camera which is particularly used with video recorders.

2. Description of the Prior Art

Video recording systems including, in combination, a video camera and a video recorder are being broadly utilized.

Among such video recording systems, most video recording systems of simple type utilizing, for example, a cassette type video recorder are so arranged that all circuits in the camera are energized by a power supply in the recorder or other external power supply when the camera is operatively connected with the recorder or when a power switch in the recorder is turned on in the connection of the camera with the recorder or when a recording button is further turned on under the turning on of the power switch. Thus, the camera is in operation and the recorder is set at its standby state for recording. Under such a situation, when a trigger button in the camera is turned on, a recording start signal is fed from the camera to the recorder to initiate the operation of the latter so that any video output from the camera will be recorded on a video tape in the recorder. This is due to the fact that an image pick-up tube in the camera must be heated to its normal operation temperature, that is, to such a condition as to generate appropriate image scanning signals for a very long time period such as about ten seconds. However, such very long time period for heating is required only by the heater circuit in the image pick-up tube but not by the other circuits in the same. In the entire camera, the heater circuit for the image pick-up tube has about 20% of electric power consumption while about 80% of the electric power consumption is shared by the other camera circuits. The energization of all circuits in the camera, for example, when the recorder is set at its standby state for recording provides substantial loss in electric energy in the camera. This is disadvantageous particularly in portable video systems having limited capacity of electric energy.

SUMMARY OF THE INVENTION

In view of such a situation of the prior art, it is a main object of this invention to provide an improved video camera having an image pick-up tube and being used with video recorders, by which the above disadvantage in electric power consumption can be eliminated.

According to this invention, such main object is accomplished by providing a video camera which is provided with first and second trigger switches manually operated in succession, in which at least a heater circuit for an image pick-up tube is energized when the camera is operatively connected with the video recorder or when a power switch in the recorder is turned on in the connection of the camera with the recorder or when a recording switch is turned on under the above state, and in which other circuits in the camera are energized by turning on the first trigger, switch, the camera being adapted to generate a recording start signal for the recorder when the second trigger switch is turned on.

Another object of this invention is to provide a video camera of the above type having an image pick-up tube which can be heated to its normal operation temperature, that is, to such a condition as to generate appropriate image scanning signals through relatively short period of time after the heater circuit for the image pick-up tube has been energized.

In a preferred embodiment of this invention, the video camera further comprises means for detecting said image pick-up tube in its regular state and means for providing a recording start signal to the recorder when the image pick-up tube is in its regular state and the second trigger switch is turned on. Thus, the video camera can be further improved in accordance with this invention.

Other objects and features of this invention will be apparent from reading the following description in connection with the accompanying drawings.

BRIEF DESCRIPTION OF THE DRAWINGS

A preferred embodiment of this invention will now be described with reference to the accompanying drawings in which.

DESCRIPTION OF THE PREFERRED EMBODIMENT

First of all, a general form of a well-known video recording system comprising, in combination, a video camera and a cassette type video tape recorder will be described with reference to FIG. 1. The video camera CA is operatively connected with the video tape recorder VTR through a connecting cable CC. Electric power is supplied from a power supply EE in the recorder VTR to the camera CA through the connecting cable CC while the recorder VTR receives video outputs and trigger signals produced from a trigger switch SWT upon turning on a trigger button TB, that is, recording start signals from the camera CA through the connecting cable CC.

In the prior art systems, when the camera CA is connected with the recorder VTR through the connecting cable CC or when a power button PB in the recorder VTR is turned on in the connection of the camera with the recorder or when a recording button RB is further turned on under the second-mentioned state, electric energy is thus given from the power supply EE in the recorder VTR to all circuits in the camera CA so that the camera CA will be in operation to heat an image pick-up tube IT by means of its heater circuit. On the other hand, when the recording button RB is turned on, all of the circuits in the recorder such as a signal recording device, driving motors for a head cylinder and capstan and the others are energized. Thereafter, as the trigger switch SWT is turned on by operating a trigger button TB in the camera, the resulting trigger signal, that is, a recording start signal is fed to the recorder VTR so that the pinch roller thereof will be pressed against the capstan with the tape located therebetween. At the same time, a tape take-up reel is actuated to run the tape between the pinch roller and the capstan. Thus, the video output from the camera CA will be recorded on the tape in the well-known manner.

Figure 1:
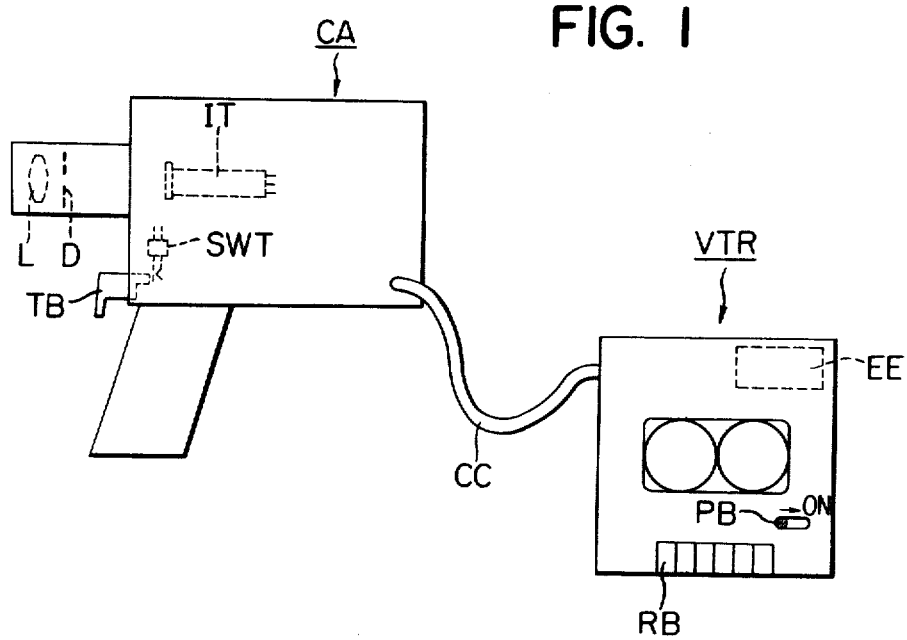
FIG. 1 is a schematic view showing a general form of a video recording system which, in combination, comprises a video camera and a video tape recorder.
Figure 2:
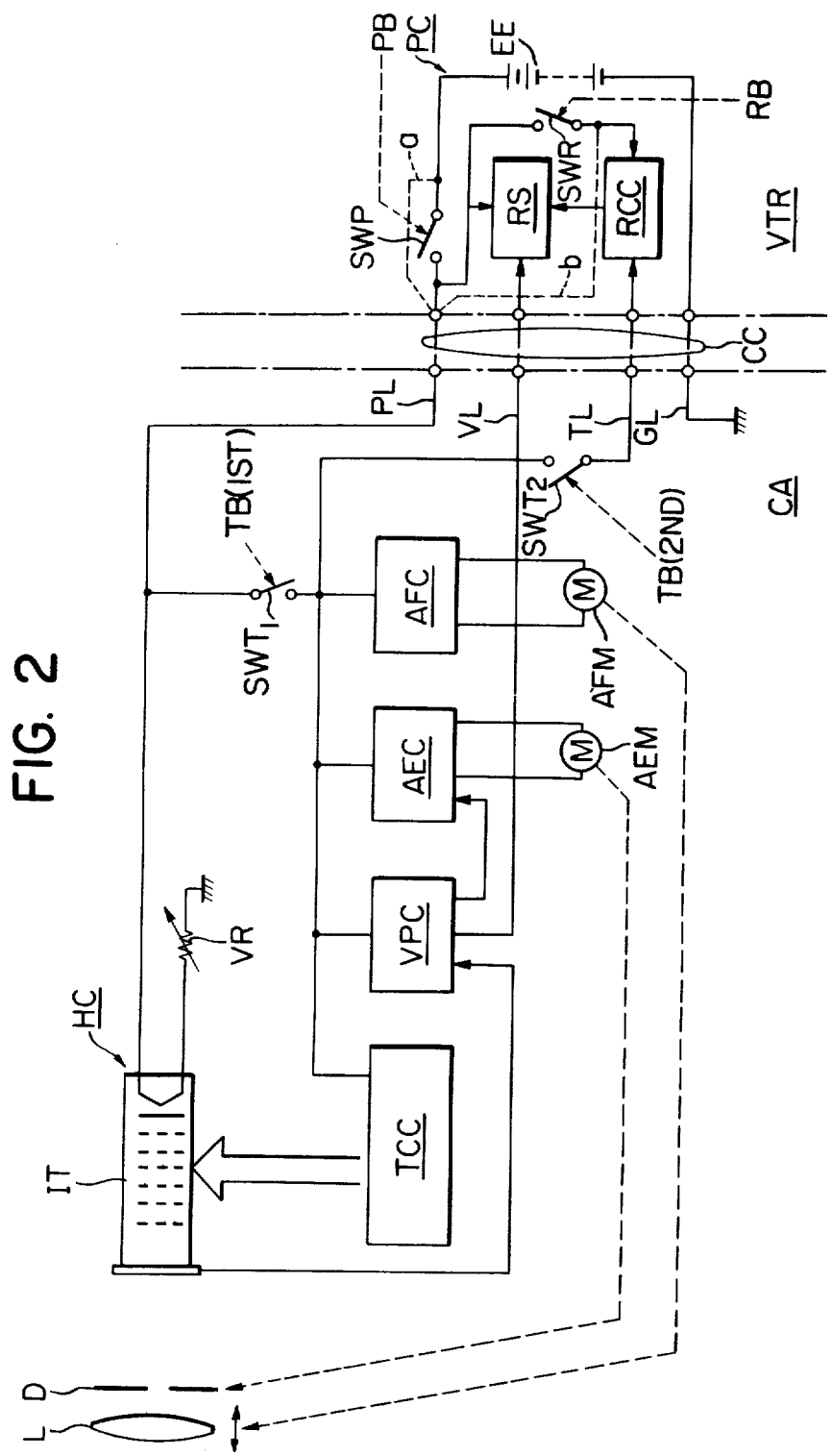
FIG. 2 is a block diagram of one embodiment of the video camera to which this invention is applied in the video recording system as shown in FIG. 1, particularly showing the main electric circuit relating to this invention under such a state that the camera is operatively connected with the recorder.

FIG. 2 shows one embodiment of this invention which is the main network improved according to this invention and used in the system of FIG. 1. The camera CA includes a heater circuit HC for the image pick-up tube IT which is connected with a power line in the camera CA to be energized from the power supply EE through the connecting cable CC when the switch SWT is turned on by operating the power button PB in the recording VTR, for example. The network of the camera CA further includes a variable resistance VR for adjusting voltage, a well-known image pick-up tube control circuit TCC including a high voltage producing circuit and a deflecting circuit, a well-known video process circuit VPC for generating video signals in response to image scanning signals from the image pick-up tube IT, a well-known automatic diaphragm control circuit AEC for generating at its output a diaphragm control signal in response to a luminance signal (Y signal) from the video process circuit VPC, and a well-known automatic focus regulating circuit AFC for producing at its output a focus regulating signal to an image pick-up lens L. These circuits are connected with a power line PL through a first trigger switch $SWT_1$ so that they will be energized from the power supply CC in the recorder VTR when the trigger switch $SWT_1$ is turned on by operating the trigger button TB in a first operating stage. Video output from the video process circuit VPC is supplied to a well-known signal recording system RS in the recorder VTR through a video signal output line VL and the cable CC. The network still further includes an automatic diaphragm adjusting motor AEM for driving a diaphragm D in response to the output of the automatic diaphragm control circuit AEC and an automatic focus regulating motor AFM for driving the imaging lens L in response to the output of the automatic focus regulating circuit AFC.

There is a second trigger switch $SWT_2$ which is adapted to turn on as the trigger button TB is operated in its second operation stage. A trigger signal (recording start signal) produced by turning on said switch $SWT_2$ is applied to a signal recording system control circuit RCC in the recorder VTR through a trigger signal output line TL and the cable CC. Further, a ground connecting line is designated by GL. There is further a recording mode switch SWR which can be turned on by operating the recording button RB. A mode setting signal from the above switch SWR is also applied to said signal recording system control circuit RCC.

The above signal recording system control circuit RCC is responsive to the throw of the recording mode switch SWR after the power switch SWP has been turned on to cause the signal recording system RS to energize all components such as tape loading means, recording head cylinder driving motor, capstan driving motor and the other circuits, except tape running means. Furthermore, in response to the trigger signal from the camera CA, the control circuit RCC is adapted to cause the signal recording system RS to energize the tape running means so that the pinch roller will be pressed against the capstan under pressure and so that the tape take-up reel will be actuated by engaging its clutch and so on. The signal recording system control circuit RCC will not be further described because it has been well known in the art.

As seen from the above description, the trigger button TB in the camera CA is in the form of two-step depressed type button in which the first trigger switch $SWT_1$ will be turned on in the first depressed step of the trigger button and the second trigger switch $SWT_2$ will be turned on in the second depressed step of the same.

In such an arrangement of the video recording system, when the camera CA is operatively connected with the video recorder VTR through the cable CC, the power line PL and the ground connecting line GL in the camera CA are connected with the power supply circuit PC of the recorder VTR including the power supply EE and the power switch SWP, and the video and trigger signal output lines VL and TL in the camera CA are respectively connected with the signal recording system RS and the signal recording system control circuit RCC in the recorder VTR through the respective connecting lines in the cable CC. When the power button PB in the recorder VTR is operated under such a situation to turn on the power switch SWP, the heater circuit HC for the image pick-up tube in the camera CA is thus energized from the power supply EE in the recorder VTR to initiate the heating of the image pick-up tube IT. On the other hand, when the recording button PB in the recorder VTR is further operated to turn on the recording mode switch SWR, the signal recording system control circuit RCC is actuated to set the signal recording system RS at its operable state so that the video tape recorder VTR will be set at its standby state for recording. The "standby state" refers to such a condition that the tape in a cassette mounted in the recorder VTR is terminated in loading for the signal recording system RS, that the motors for the head cylinder and capstan are driven while various circuit systems for recording have been energized, and that the tape has not been still moved. In the standby state, as the trigger button TB of the camera CA is operated in its first step to turn on the first trigger switch $SWT_1$, the remaining circuit of the camera CA including the image pick-up tube control circuit TCC, the video process circuit VPC, the automatic diaphragm control circuit AEC and the automatic focus regulating circuit AFC are energized so that the camera CA will be in operation. In this embodiment, thus, the diaphragm D can be automatically adjusted by the automatic diaphragm control motor AEM in response to the video output signal from the video process circuit VPC and the control signal from the automatic diaphragm control circuit AEC. The image pick-up lens L also can be automatically regulated with respect to its focus by the automatic focus regulating motor AFM in response to the control signal from the automatic focus regulating circuit AFC. In such a situation, when the trigger button is further operated in its second step to turn on the second trigger switch $SWT_2$, the resulting trigger signal is applied to the signal recording system control circuit RCC as a recording start signal so that the latter will actuate the signal recording system to move the tape. As a result, the video output signals from the video process circuit VPC in the camera CA will be recorded on the running tape in the video tape recorder VTR.

If the trigger button TB is released to interrupt the recording, the recorder VTR is reset at the standby state as described hereinbefore. On the other hand, all of the circuits in the camera CA are de-energized except the heater circuit HC.

In the present embodiment, thus, only the heater circuit HC for the image pick-up tube is energized if the power button PB is operated in the recorder VTR when the camera CA is operatively connected with the recorder VTR. When the trigger button TB is operated in the first step, the remaining camera circuits such as TCC, VPC, AEC, AFC and the others are energized. When the trigger button TB is subsequentially operated in the second step, the recording start signal is generated to initiate the recording operation in the recorder VTR. Accordingly, the recording system provides much less loss in electric energy, particularly in the camera CA under the standby state thereof. In general, the portable video recording system as shown in FIG. 1 is frequently carried under its standby state, that is, under such a condition that the recorder VTR and camera CA are energized for maintaining the recording system operative. The reduction of electric energy loss is extremely advantageous particularly in such a portable video camera.

In this connection, the afore-mentioned embodiment of this invention utilizes the camera CA having the image pick-up tube. As well known in the art, the image pick-up tube generally requires relatively long time period such as about ten seconds until it will be sufficiently warmed up to its given regular state in which appropriate image scanning signals are generated after the tube has been energized. For such a reason, there is such a problem that any appropriate recording cannot be actually effected if the video camera is operated immediately after it has been switched on, resulting in extremely inferior images particularly in the first portion of a scene. An improved embodiment of this invention for solving such a problem will now be described with reference to FIG. 3.

Figure 3:
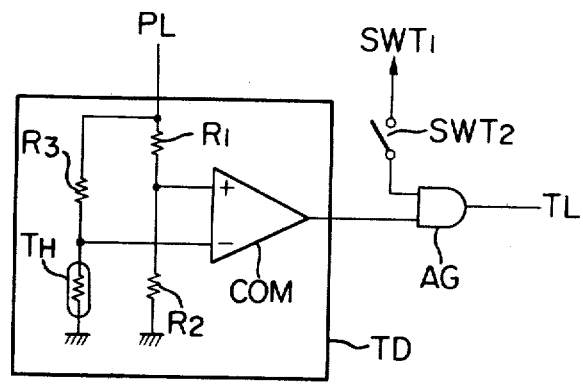
FIG. 3 is a partial diagram of the FIG. 2 circuit, particularly showing a circuit portion which is improved in accordance with this invention.

In FIG. 3, TD designates a circuit for detecting the image pick-up tube IT in its predetermined regular state. This detecting circuit TD is adapted to detect the image pick-up tube which has been warmed up sufficiently. The detecting circuit TD includes a thermistor TH as a temperature sensing element which is disposed near the image pick-up tube IT, preferably near the heater circuit HC therefor such that the resistance of the element will be changed in accordance with the temperatures in the image pick-up tube IT. The detecting circuit TD further includes a voltage dividing resistor $R_3$ connected in series with the thermistor TH to form a voltage dividing circuit which is connected with the power line PL. This circuit has a voltage dividing point which is connected with the reversing input terminal of a comparator COM. Resistors $R_1$ and $R_2$ are connected in series with each other to form a voltage dividing circuit which is connected with the power line PL and has a voltage dividing point connected with the non-reversing input terminal of the comparator COM. The resistance of the thermistor TH decrease as the ambient temperature rises. The resistances of the resistors $R_1$ and $R_2$ is selected such that the potential in their dividing point corresponds to that potential in the dividing point between the resistor $R_3$ and the thermistor TH when the image pick-up tube IT has been warmed up sufficiently to generate appropriate image scanning signals. Such a potential is a reference potential used for detecting the image pick-up tube IT in its regular state. Thus, the comparator COM will generate, as the output of said detecting circuit TD, a signal in low level until the image pick-up tube IT is heated to its regular state, and a signal in high level as the image pick-up tube reaches the regular state.

The detecting circuit TD is connected with AND gate AG which is adapted to receive the output signal from the detecting circuit TD, that is, from the comparator COM and the operating signal from the second trigger switch $SWT_2$. When both these signals are in high level, the AND gate AG generates at its output a signal in high level. This high level signal in the AND gate AG is applied to the output line TL as a recording start signal.

In the modified embodiment shown in FIG. 3, the video tape recorder VTR can be thus started for recording only when the image pick-up tube is in its regular state and the second trigger switch $SWT_2$ is turned on.

The detection of the image pick-up tube IT in its regular state may be accomplished by other methods. For example, the detection can be effected in response to the output level of the image pick-up tube IT or the output level of the video process circuit VPC. More direct methods may be also adopted in this invention.

In the embodiment shown in FIG. 2, the heater circuit for the image pick-up tube IT is energized if the power switch SWP in the recorder VTR is turned on when the camera CA is connected with the recorder VTR. As shown by a broken line a in FIG. 2, however, the heater circuit HC may be simultaneously energized when the camera CA is operatively connected with the recorder VTR. Alternatively, the heater circuit HC may be energized when both the power switch SWP and recording mode switch SWR are turned on under the connection of the camera CA with the recorder VTR as shown by a broken line b in FIG. 2. Furthermore, the video tape recorder VTR may be connected with any suitable external power supply rather than the contained power supply EE. It is therefore to be understood that this invention is not intended to be limited to the illustrated embodiments and that many changes and modifications can be effected without departing from the scope of this invention.

What we claim is:

1. A video recording system comprising in combination:
   (A) image pick-up means for generating signals indicative of image scansion;
   (B) processing circuit means for processing said signals generated by said image pick-up means to produce video signals;
   (C) recording means for recording said video signals produced by said processing circuit means, said recording means having an inoperative state, a standby state for preparation of signal recording and an operative state for actual signal recording; and
   (D) setting means including:
      (1) first means for energizing said image pick-up means and for setting said recording means to its standby state from its inoperative state;
      (2) second means for energizing said processing circuit means; and
      (3) third means for generating a control signal for setting said recording means to its operative state from its standby state.

2. The system according to claim 1, wherein said image pick-up means includes at least one image pick-up tube and a heater circuit for heating said image pick-up tube, said first means being arranged to energize said heater circuit.

3. The system according to claim 1, wherein said image pick-up means has a predetermined stable state and said setting means further includes:

detecting means for detecting whether said image pick-up means has reached said predetermined stable state, said detecting means producing a characteristic output upon detection that the image pick-up means has reached said stable state; and control means responsive to said characteristic output of said detecting means to control the supply of said control signal generated by said third means to said recording means.

4. The system according to claim 3, wherein said image pick-up means includes at least one image pick-up tube and a heater circuit for heating said image pick-up tube;

wherein said first means is arranged to energize said heater circuit, said predetermined stable state of the image pick-up means includes a state in which said image pick-up tube is heated to a predetermined temperature by said heater circuit, and said detecting means in said setting means is arranged to detect whether said image pick-up tube is heated to said predetermined temperature and to produce said characteristic output upon detection that the image pick-up tube is heated to said temperature.

5. The system according to any one of claims 1, 2, 3 or 4, wherein said first, second and third means in said setting means are manually operable.

6. The system according to claim 5, wherein said second and third means are arranged to be operable in succession.

7. The system according to claim 6, further comprising:

manually operable trigger means for operating said second and third means in succession.

8. The system according to claim 7, further comprising:

focus adjustable lens means for forming an image of an object on said image pick-up means; and automatic focusing means for automatically focusing said lens means onto the object, said focusing means being arranged to operate in response to said second means.

9. The system according to claim 6, further comprising:

focus adjustable lens means for forming an image of an object on said image pick-up means; and automatic focusing means for automatically focusing said lens means onto the object, said focusing means being arranged to operate in response to said second means.

10. The system according to claim 5, further comprising:

focus adjustable lens means for forming an image of an object on said image pick-up means; and automatic focusing means for automatically focusing said lens means onto the object, said focusing means being arranged to operate in response to said second means.

11. The system according to claim 1, further comprising:

focus adjustable lens means for forming an image of an object on said image pick-up means; and automatic focusing means for automatically focusing said lens means onto the object, said focusing means being arranged to operate in response to said second means.

* * * * *